United States Patent [19]

Kolpak et al.

[11] Patent Number: 5,205,310
[45] Date of Patent: Apr. 27, 1993

[54] SYSTEM AND METHOD FOR FLOW CONTROL FOR HIGH WATERCUT OIL PRODUCTION

[75] Inventors: Miroslav M. Kolpak, Plano; William D. Hetherington, Richardson, both of Tex.

[73] Assignee: Atlantic Richfield Company, Los Angeles, Calif.

[21] Appl. No.: 758,659

[22] Filed: Sep. 12, 1991

[51] Int. Cl.[5] .......................................... B01D 17/025
[52] U.S. Cl. .......................................... 137/2; 137/172
[58] Field of Search .......................... 137/172, 173, 1, 2

[56] References Cited

U.S. PATENT DOCUMENTS

| | | | |
|---|---|---|---|
| 2,051,180 | 8/1936 | Ruzicka | 137/172 |
| 2,701,602 | 2/1955 | Crawford | 137/172 X |
| 2,984,360 | 5/1961 | Smith | 137/172 X |
| 3,202,167 | 8/1965 | DeYoung | 137/173 |

Primary Examiner—Alan Cohan
Attorney, Agent, or Firm—Michael E. Martin

[57] ABSTRACT

Net oil production from a low volume high watercut well or other source of a water-oil mixture is accurately metered with systems which include a separator vessel which allows a water-oil mixture to collect and form a separate oil layer on top of the water and which has liquid level sensors and an oil detector which measures the presence of an oil layer. The sensors are arranged in such a way with associated control circuits so that the vessel does not discharge oil until a significant accumulation of an oil layer occurs in the vessel. The systems each include a liquid discharge conduit and a motor operated control valve connected to a logic circuit which receives signals from the level sensors and the oil detector to provide cyclic operation of the valve to discharge water from the vessel repeatedly until a relatively large quantity of oil collects and then discharges all of the oil prior to resumption of the operating cycle.

20 Claims, 4 Drawing Sheets

SYSTEM AND METHOD FOR FLOW CONTROL FOR HIGH WATERCUT OIL PRODUCTION

BACKGROUND OF THE INVENTION

1. Field of the Invention

The present invention pertains to systems and methods for controlling liquid outflow from a liquid-gas separator to improve accuracy of measuring oil production from wells which produce mostly water.

2. Background

Production from wells which are likely to produce significant amounts of water poses certain problems in measuring the net oil content of the production stream. Typically, a well may produce fluids which are collected in a separator tank for separating gas from the liquid flow stream and wherein the liquid flow stream is then conducted through a meter for measuring the water content of the liquid mixture (the so-called "watercut") and a flow meter for measuring the total liquid flow rate. In such arrangements, the net oil production in the flow stream, when passed through the watercut meter, provides highly inaccurate measurements of net oil flow.

For example, in marginally economic and so-called "high watercut" oil production wells, the identification of the net oil production is difficult because the accuracy of measurement of the water content of the flow stream is particularly low in arrangements where a conventional two-phase separator uses a liquid dump valve which periodically releases a fixed volume of liquid. In such arrangements, flow rates and watercut are measured continuously as each slug or fixed volume of liquid passes through the respective meters. In wells wherein only a relatively thin layer of oil accumulates in the separator vessel above the water prior to being dumped, the accuracy of measuring the net oil production is relatively low. The watercut meter must respond virtually instantaneously to a large change in the water content of the mixture, and the flow rate, from near one hundred percent (100%) to near zero percent (0%) water content, for example. It is not uncommon to experience at least a ten percent (10%) error in net oil production measured with conventional arrangements. The present invention overcomes this problem with a unique flow control system used in combination with a separator vessel for receiving the well production flowstream. Improving the oil metering accuracy for high watercut wells will allow more accurate discrimination about which wells are still economic and which should be shut in.

SUMMARY OF THE INVENTION

The present invention pertains to a unique liquid collection and control system for improving the accuracy of measuring net oil production, particularly from high watercut oil wells and the like.

In accordance with an important aspect of the present invention, there is provided a liquid level control system for a separator vessel which is connected to receive a multi-phase flowstream from an oil well or the like which includes a liquid level control system for controlling flow from the separator vessel to provide a relatively large slug or quantity of oil for more accurate measurement of the net oil production from a well.

The present invention advantageously provides a liquid level controller for controlling the flow of liquid from a separator vessel so that substantially water-free oil is not released from the vessel until a volume of oil has accumulated which is a more accurately measurable quantity whereby more accurate measurements of net oil production from a well may be obtained. The present invention utilizes unique control circuits in combination with liquid level and liquid composition sensing devices in a separator vessel for controlling flow from the separator vessel to watercut and flow rate measuring devices. Certain embodiments of the invention also improve liquid flow-measurement accuracy and minimize wear on the control valves and actuation means therefor.

Those skilled in the art will recognize the above-described features and advantages of the present invention as well as other superior aspects thereof upon reading the detailed description which follows in conjunction with the drawing.

DESCRIPTION OF PREFERRED EMBODIMENTS

In the description which follows like parts are marked throughout the specification and drawing with the same reference numerals, respectively. The drawing FIGURES are somewhat simplified schematic diagrams in the interest of clarity and conciseness.

Figure 1:
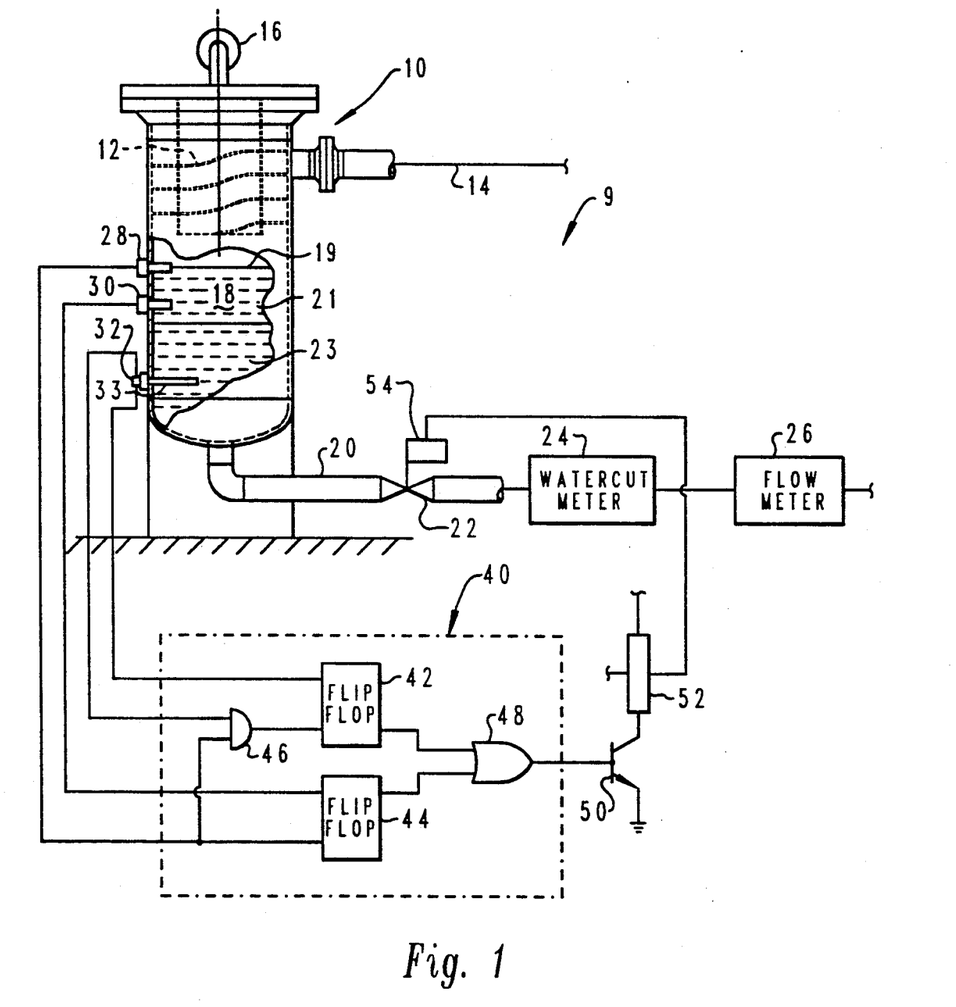
FIG. 1 is a schematic diagram of one preferred embodiment of the present invention.

Referring to FIG. 1, there is illustrated a system 9 in accordance with the present invention including a two-phase fluid separator vessel, generally designated by the numeral 10. The separator vessel 10 includes suitable means 12 for separating gas from liquid in a multi-phase fluid flowstream entering the vessel 10 by way of an inlet conduit 14 which typically may be connected directly to a wellhead, not shown, of a marginally productive oil well. The flowstream entering the vessel 10 is typically an oil-water mixture of relatively high water content and entrained gas which is separated from the oil-water mixture and conducted away from the vessel 10 by way of a gas discharge conduit 16. Liquid which accumulates in the interior space 18 of the vessel 10, typically includes an oil layer 21 on top of a water layer 23, both of which vary in thickness depending on the content of the incoming flowsteam and the operation of the various embodiments of the present invention. Liquid is periodically discharged from the vessel through a bottom discharge conduit 20 which has a motor operated control valve 22 interposed therein for controlling the flow of liquid from the vessel 10 to a meter 24 for measuring the water content of the liquid flowstream, which meter is known in the art as a "watercut" meter. One example of such a meter is described in U.S. Pat. No. 4,862,060 to Bentley N. Scott et al and assigned to the assignee of the present invention. The conduit 20 also has interposed therein a conventional fluid flowmeter 26 for measuring the volume or mass flow rate of the total fluid flow through the conduit 20.

The vessel 10 also includes a first liquid level sensor 28 mounted on the vessel in such a way as to detect when liquid level reaches the elevation of the sensor. A second liquid level sensor 30 is mounted below and spaced from the sensor 28 in such a way as to detect when the liquid level 19 in the vessel space 18 has been lowered from the elevation of the sensor 28 a predetermined amount. Still further, a third sensor 32 is mounted on the vessel 10 in such a way as to sense the presence or absence of liquid and the type of liquid at a level in the space 18 below the sensor 30. The sensors 28 and 30 may comprise switches of a type manufactured by Delavan, division of Colt Industries, Inc. under the trade name Sonac, specifically a Model 120 capacitance type liquid level sensing switch. The sensor 32 may be of a capacitance type also manufactured by the above-mentioned company under the trademark Capoint and as a model 520-2. The sensor 32 is operable to sense the presence of liquid oil at the level of a sensor probe 33 and to detect the absence of any liquid at that level. The sensor 32 is operable in such a way that two signals are provided which are suitable for processing by a control circuit, generally designated by the numeral 40. The absence of liquid at the level of probe 33 will provide a signal from sensor 32 to the circuit 40 and the presence of oil at the probe 33 will also provide a signal to the circuit.

The control circuit 40 is operable to receive input signals from the sensors 28, 30 and 32 as indicated. The circuit 40 includes flip-flop circuits 42 and 44, an AND gate 46, an OR gate 48, a switch 50 and a relay 52 operably connected to the motor operator 54 of the valve 22 in such a way as to effect opening and closing of the valve. In the schematic of the circuit 40, the connections between the sensors 28, 30, 32 and the circuit 40 are simplified in the interest of clarity and conciseness by, for example, eliminating reference to a source of electrical signal to be imposed on the sensors 28, 30 and 32 for transmission to the circuit 40.

A typical operating cycle of the system 9 may be carried out as follows. Assume the interior space 18 of the vessel 10 is void of liquids. Sensor 32 provides a signal to flip-flop 42 causing the output signal of flip-flop 42 to signal OR gate 48 to turn on switch 50 and energize relay 52 and close valve 54. When the liquid level in vessel space 18 reaches the sensor 28, a signal is transmitted to flip-flop 44 and to AND gate 46. A signal is output from the flip-flop 44 to the OR gate 48 which, with signals now imposed thereon by both flip-flops, changes its signal to switch 50 to deenergize the relay 52 and open the valve 22 to allow liquid, primarily water, to flow out of the space 18 through meters 24 and 26. If sensor 32 is not sensing oil when sensor 28 detects liquid, then no signal from sensor 32 will be sent to AND gate 46 and thus no signal will be sent to flip-flop 42. Flip-flop 44 will continue to signal OR gate 48 until sensor 30 detects gas and signals flip-flop 44 to signal OR gate 48 to turn on switch 50 and energize relay 52 for the next cycle.

This cycle repeats until the oil layer thickness in the vessel 10 increases and until a condition exists wherein, upon an increase in the liquid level 19 in the space 18, if the probe 33 senses oil when the sensor 28 detects a rising liquid level, signals are imposed by the sensors 28 and 32 on the AND gate 46, a signal is then transmitted from the AND gate to the flip-flop circuit 42 and a signal is output from the circuit 42 to the OR gate 48 causing the switch 50 to be in a position to effect moving the valve 22 to the open position. Accordingly, even if the liquid level 19 in the space 18 drops below the sensor 30, as long as the probe 33 senses the presence of oil, liquid will continue to be discharged from the vessel 10 and flow through the meters 24 and 26. In this way, a relatively large quantity of substantially water-free oil may be conducted from the vessel through the meters 24 and 26 for measurements of substantially increased accuracy of the quantity of oil being produced through the system 9.

When the liquid level 19 falls below the probe 33, a second signal is emitted from the sensor 32 to the flip flop circuit 42 to reset this circuit and cancel the signal to the OR gate 48, thereby effecting operation of the switch 50 to close the valve 22 through operation of the relay 52 and the motor operator 54. Liquid begins to accumulate in the vessel 10 until the controller again goes through the operating cycles just described.

As will be appreciated from the foregoing, the effect of operation of the system 9 described and illustrated is that a fairly significant quantity of oil will accumulate in the vessel 10 before it is discharged through the conduit 20 and the meters 24 and 26 so that improved accuracy of measurement of the net oil production is obtained. Without the controller system 9, described, a simple on/off liquid level control in accordance with prior art systems would, particularly with high watercut production, cause a quantity of liquid to leave the space 18 which would be substantially water followed by a very small amount of oil as the liquid level falls to the bottom of the space 18 and exits through the conduit 20. This would impose a burden on the meters 24 and 26 to measure only a very small amount of oil over a very short time period, thus decreasing the accuracy of measurement substantially. However, another advantage of the system 9 is that the oil flow rate can be determined without using a meter 24. The relation between the oil flow rate, the number of cycles of operation of the system 9 and the system geometry as determined by the dimensions of the vessel 10 and the levels of the sensors 28, 30 and 32 can be correlated to solve an equation which yields the oil flow rate. For example, the following equation may be solved to determine the oil flow rate.

The system 9 is well suited for low flow-rate wells which do not produce difficult-to-break or "tight" emulsions of oil and water and whose liquid output doesn't change substantially, i.e. by one hundred percent (100%) or more over short periods of time. If the oil layer in the vessel 10 is substantially emulsified, the system 9 will provide an approximate value of the oil flow rate or "oil cut".

Figure 2:
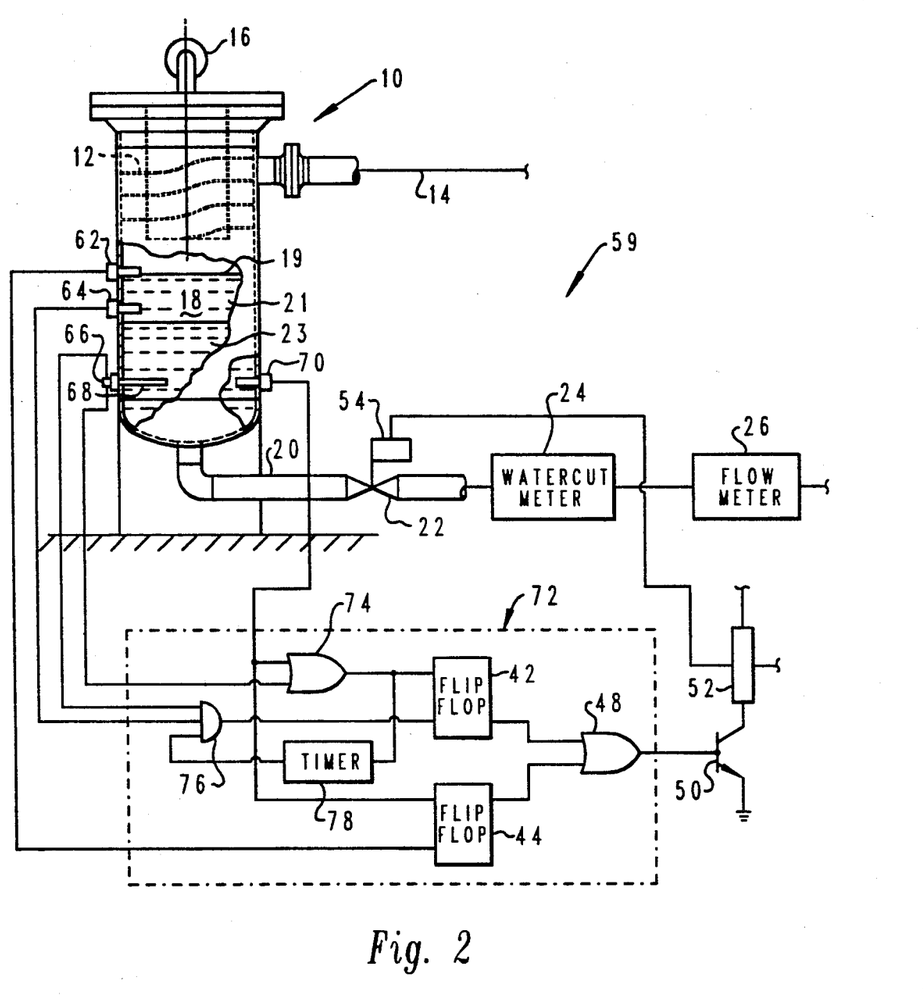
FIG. 2 is a schematic diagram of a first alternate embodiment of the present invention.

Referring now to FIG. 2, another embodiment of the present invention is illustrated and generally designated by the numeral 59. The system 59 includes the separator vessel 10 and the above-described arrangement of the discharge conduit 20, shut-off valve 22 and the meters 24 and 26. In the system 59 shown in FIG. 2, first and second liquid level sensors 62 and 64 are mounted relatively closely adjacent to each other for sensing a top or increasing liquid level 19 in the space 18. An oil and water sensor 66 is provided having a probe 68 which is operable to provide signals when sensing the presence of oil and water, respectively, by the probe. A liquid level sensor 70 is also provided which is mounted at an elevation in the vessel 10 generally even with the probe 68 and below the sensor 64. The sensors 62, 64 and 70 may be similar to the sensors 28 and 30 and the sensor 66 may be similar to the sensor 32.

A modified control circuit 72 includes the OR gate 48, flip-flop circuits 42 and 44, a second OR gate 74, an AND gate 76 and a timer circuit 78. The system 59 is operable to minimize the rapid cycling of the control valve 22 if a condition exists wherein a relatively thin layer of water begins to accumulate as a result of cycling the valve between the open and closed positions to dump water from the space 18. The operation of the system 59 is typically as follows. Liquid accumulates in the space 18 until it reaches the level sensor 64, a signal is then sent to the AND gate 76. The timer 78 indicates that it is not in a timing mode and if a signal is received from the sensor 66 indicating the presence of water at the level of the probe 68 in space 18, a signal is transmitted to the flip-flop circuit 42 to provide an output to the OR gate 48 effecting operation of the switch 50 and the relay 52 to open the valve 22. The valve 22 will remain open until the sensor 66 senses the presence of oil at the probe 68 and transmits a signal to the OR gate 74, or the sensor 70 senses a drop in liquid level in the space 18 to the elevation of the sensor 70. In either case the OR gate 74 transmits a signal to the flip-flop circuit 42 to effect a shut-off of signal to the OR gate 48 and operation of switch 50 to effect closure of the valve 22 unless a signal is imposed on the OR gate 48 from the flip-flop 44.

When an output signal is received from the OR gate 74, the timer 78 is operable to signal the AND gate 76 to prevent an output signal from the AND gate which would effect reopening the valve 22 until the timer reaches the end of its timing cycle, which cycle can preferably be adjusted for operating conditions of the system illustrated. Accordingly, even though the liquid level in the space 18 may rise above the sensor 64, the sensor will not be operable to effect operation of the switch 50 and the valve 22 until a timing signal, indicating the timer is not timing, is reinstated to the AND gate 76.

However, if the liquid level 19 in space 18 should rise to an elevation which effects operation of the sensor 62, a signal is transmitted to the flip-flop circuit 44 which imposes a signal on the OR gate 48. The OR gate 48 then transmits a signal to the switch 50 effecting opening of the valve 22 until the sensor 70 detects a decrease in liquid level in space 18 to the elevation of the sensor 70, at which time a signal is transmitted to the flip-flop 44 to effect a change of state of the OR gate 48 and closure of the valve 22 through deletion of the operating signal to the switch 50. In this way, rapid cycling of the valve 22 is prevented for a condition wherein the thickness of the oil layer 21 in the space 18 is such that the oil layer substantially occupies the space between the elevation of the sensor 64 and the elevation of the oil and water detector probe 68. Oil is discharged from the space 18 only when the liquid level 19 rises to the elevation of the sensor 62.

Figure 3:
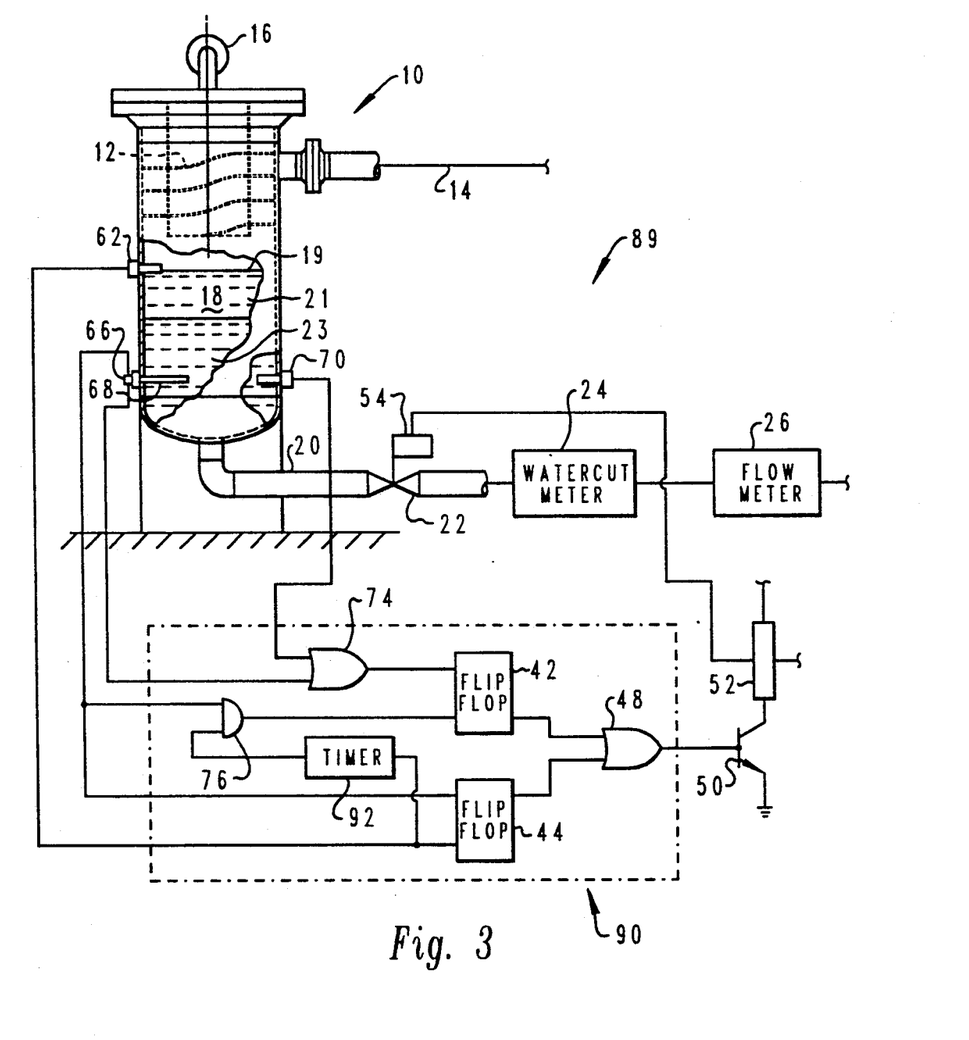
FIG. 3 is a schematic diagram of a second alternate embodiment of the present invention.

Referring now to FIG. 3, a second alternate embodiment of a system in accordance with the present invention is illustrated and generally designated by the numeral 89. The system 89 includes level sensor 62 disposed above sensor 66 in the vessel 10 and a level sensor 70 which may be disposed generally at the same level in the vessel space 18 as the sensor 66. The control circuit for the system 90 includes an arrangement of OR gates 48 and 74, flip-flop circuits 42 and 44, an AND gate 76 and a timer circuit 92 operable to receive signals from the sensor 62.

The operation of the system 89 is generally as follows. If the liquid level 19 rises to the level of the sensor 62, the flip-flop circuit 44 sends a signal to OR gate 48 effecting opening of the valve 22 until the sensor probe 68 senses the presence of the oil layer 21 at the level of the probe as the liquid level drops in the space 18. Upon sensing the oil layer 21 at the probe 68 a signal is sent to the flip-flop circuit 44 to reset that circuit and delete the signal to the OR gate 48 effecting energization of the relay 52 to close the valve 22. However, if the oil layer 21 accumulates such that it occupies a major portion of the space between the sensors 62 and 66 continued inflow of liquid into the separator vessel 10 will tend to increase the cycling rate of opening and closing of the valve 22 since only a small part of the water layer 23 may occupy the space above the sensor 66. In this regard, the timer circuit 92 may be operable to provide an output signal to the AND gate 76 if a signal is received from the sensor 62 by the timer circuit more frequently than a predetermined interval.

Accordingly, if the frequency of actuation of the sensor 62 increases above the preset timed interval, an output signal is sent from the timer circuit 92 to the AND gate 76 and if a signal is also present at the AND gate from the sensor 66 indicating oil sensed by the probe 68 a signal is sent to the flip-flop circuit 42 to effect operation of the OR gate 48 to cause the relay 52 to effect opening of the valve 22 or to continue holding the valve 22 in its open position until liquid falls to a level sensed by the sensor 70. The sensor 70, upon sensing a level of liquid at the elevation of that sensor, sends an output signal to the OR gate 74 resetting the flip-flop circuit 42 and also to the flip-flop circuit 44 resetting that circuit to effect deletion of a signal to the OR gate 48 and resultant closing of the valve 22. Liquid will accumulate in the vessel 10 until the liquid level 19 causes the sensor 62 to generate a signal to effect opening of the valve 22 to begin dumping water again until the oil layer 21 builds up in the vessel space 18 between the sensors 62 and 66 to a thickness such that the cycling of the valve 22 becomes more frequent than the timer 92 will permit whereupon the oil dump cycle will operate again to maintain the valve 22 open until a substantial oil layer 21 is discharged from the vessel 10.

Figure 4:
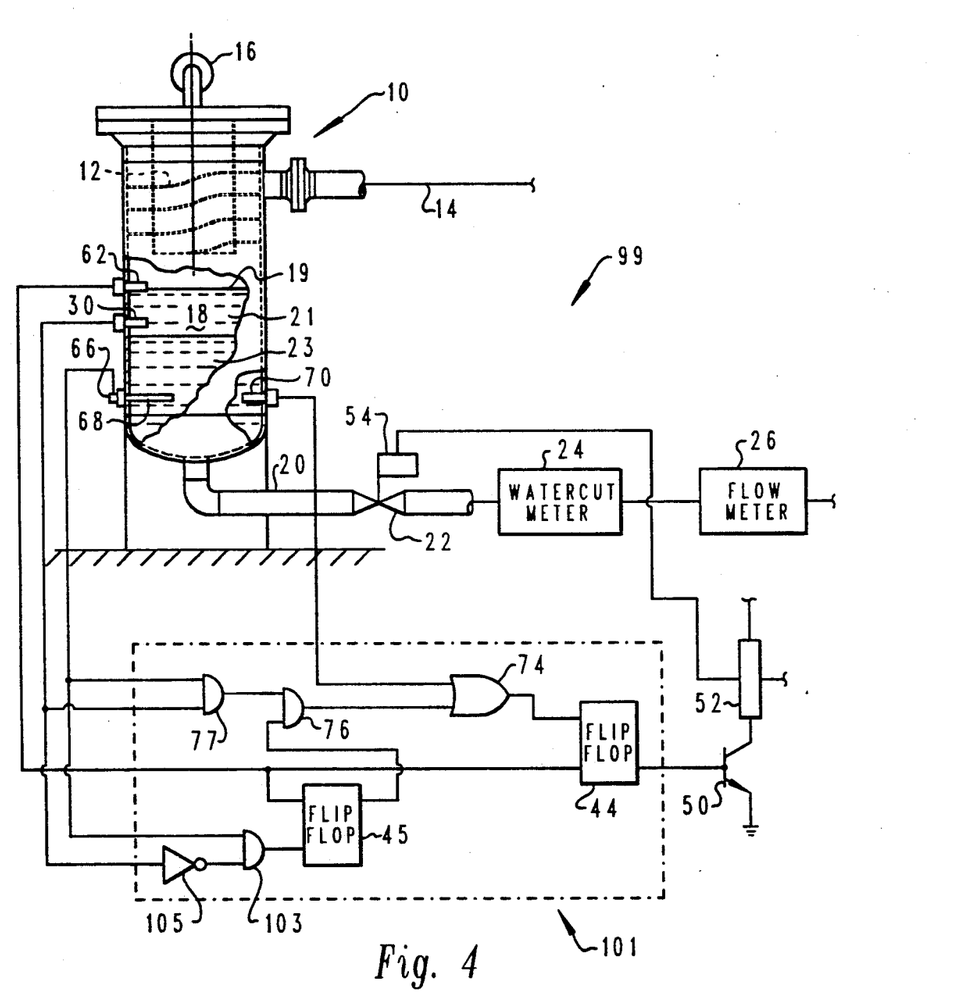
FIG. 4 is a schematic diagram of a third alternate embodiment of the present invention.

Referring now to FIG. 4, there is illustrated a third alternate embodiment of the present invention comprising a measurement system generally designated by the numeral 99. The system 99 is similar to the system 89 except that a modified control circuit 101 is connected to the switch 50 and to the sensors 62, 30, 66 and 70. The system 99 operates to open the valve 22 if the liquid level rises to the level of the sensor 62 and the valve closes if oil is detected at the sensor 66 and the liquid level has dropped to or below the sensor 30. However, if the sensor 66 detects the oil layer 21 before the sensor 30 detects the drop in liquid level 19 to the level of sensor 30, the valve 22 is maintained in an open position until the liquid level 19 drops to the level of sensor 70. The sensors 66 and 70 may be disposed at generally the same elevation in the vessel 10.

The system 99 permits the accumulation of a relatively thick oil layer 21 before it is discharged through the valve 22. In fact, the oil layer 21 will accumulate until its thickness in the space 18 is at least equal to the difference in elevation between the sensor 66 and the sensor 62 before it will be discharged to the meter 24.

A control circuit 101 includes a flip-flop circuit 44 operable to receive a signal from the sensor 62 to effect opening of the valve 22 through the switch 50 and the relay 52. The flip-flop circuit 44 may be reset upon receiving a signal from OR gate 74 from the level sensor 70 or from an AND gate 76. The AND gate 76 is operably connected to a second AND gate 77 and to a second flip-flop circuit 45. The flip-flop circuit 45 receives set and reset signals from an AND gate 103 and from the sensor 62. The AND gate 77 receives signals from the sensor 30 and the sensor 66 when the sensor 66 detects the presence of oil. The AND gate 103 receives input signals from the sensor 66 and is connected to the sensor 30 by way of a NOT gate 105.

The operation of the system 99 is generally as follows. Rising liquid level 19 in the space 18 to the level of the sensor 62 will effect operation of the switch 50 to open the valve 22 by setting the flip-flop circuit 44 to produce a suitable output signal. A signal from the sensor 62 will also set the flip-flop circuit 45 to produce an output signal to the AND gate 76. If the liquid level 19 falls to the level of sensor 30 and oil is detected at the sensor 66, the AND gate 77 produces an output signal to the AND gate 76 which, having a signal from the flip-flop circuit 45 will effect resetting of the flip-flop circuit 44 through the OR gate 74. When the liquid level 19 falls to the level of the sensor 70, the OR gate 74 will also reset the flip-flop circuit 44 to effect closure of the valve 22 through the switch 50 and relay 52.

However, if the sensor 66 detects the oil layer 21 at the probe 68 before the liquid level 19 falls to the level of the sensor 30 the AND gate 103 receives signals from the sensor 68 and from the NOT gate 105 and causes the flip-flop circuit 45 to reset thereby deleting an output signal from that circuit to the AND gate 76. Accordingly, the AND gate 76 will not produce an input signal to the OR gate 74 and the flip-flop circuit 44 will not be reset until the liquid level 19 falls to the level of the sensor 70. In this way, when an oil layer 21 in the space 18 accumulates to the thickness of the distance between the sensor 66 and the sensor 30, the valve 22 will be held in an open position until the liquid level 19 drops to the level of the sensor 70. In the other condition, that is when oil is not detected at the sensor 66 until the liquid level 19 has declined below the sensor 30, the valve 22 will be closed to complete an operating cycle and allowing only water to be discharged from the vessel 10. The system 99 will cycle to discharge water from the vessel 10 until an oil layer of sufficient thickness accumulates to permit a relatively accurate measurement of oil by the meters 24 and 26.

Accordingly, the embodiments of the present invention described provide a system for permitting accumulation of an oil layer 21 in the vessel 10 until a significant amount of oil is present so that it may be accurately measured by the meters 24 and 26. The systems, 9, 59, 89 and 99 all provide for improved measurement accuracy of the oil production from a stream of an oil and water mixture when compared with a system which merely dumps liquid from a separator vessel such as the vessel 10 in response to high and low level sensors. The systems described hereinabove are adapted to concentrate the oil layer 21 to substantially the same degree. Moreover, the systems 89 and 99 are also preferred because they cause actuation of the valve 22 less frequently than the system 9. Moreover, the systems described herein can also be operated to determine the amount of oil discharged from the vessel 10 without using a meter such as the meter 24 to determine the percentage of oil present in the flow stream, particularly for conditions wherein a difficult to break emulsion is not present. For example, in the system 9 the fraction of total flow measured by the meter 26 which is oil or is the so-called "oil cut" (OC) may be expressed according to the following equation:

$$OC = \frac{(H_{30} - 2H_{32})}{(H_{30} - H_{32}) + \frac{N(H_{28} - H_{30})}{\left(1 - \frac{V_f}{V_d}\right)}}$$

wherein, $H_{28}$, $H_{30}$, and $H_{32}$ are the elevations of the respective sensors 28, 30 and 32 from the bottom of the vessel 10, N is the number of cycles of discharging water per cycle of discharging oil, $V_f = (H_{28} - H_{32})/\Delta t_1$ where $\Delta t_1$ is the elapsed time during filling of the vessel 10 between the sensors 32 and 28, and $V_d = (H_{28} - H_{32})/\Delta t_N$, where $\Delta t_N$ is the elapsed time during a cycle of discharging oil from the vessel 10. Appropriate circuit boards could be adapted to measure the quantities in, $V_f$ and $V_d$. The systems 59, 89, and 99 can also be adapted to determine the fraction of oil flowing through the meter 26 using similar measurements and thus not requiring the use of the meter 24.

Although preferred embodiments of the invention have been described in detail herein, those skilled in the art will recognize that various substitutions and modifications may be made to the embodiments described without departing from the scope and spirit of the invention as recited in the appended claims.

What is claimed is:

1. A system for measuring the net oil production from a relatively high watercut source of a mixture of oil and water comprising:
   a vessel including a conduit for admitting an oil-water mixture to said vessel, a space within said vessel for holding a quantity of oil and water mixture to allow a separate oil layer to accumulate above a layer of water in said space, and a discharge conduit for discharging both liquid oil and water from said vessel;
   valve means interposed in said discharge conduit for controlling the flow of liquid from said vessel; and
   control means for controlling the flow of liquid from said vessel through said discharge conduit so that said layer of water is discharged from said vessel through said discharge conduit and said separate oil layer is discharged from said vessel through said discharge conduit when a predetermined accumulation of said oil layer has occurred.

2. The system set forth in claim 1 wherein:
   said control means includes first sensor means for sensing a maximum level of liquid in said vessel, second sensor means for sensing a level of liquid in said vessel below said first sensor means, oil detector, means for sensing an oil layer in said vessel in response to a falling level of liquid in said vessel, and a control circuit responsive to receiving signals from said sensor means and said oil detector means for controlling the operation of said valve means to discharge an accumulated oil layer from said vessel.

3. The system set forth in claim 2 wherein:
   said oil detector means is mounted in said vessel at an elevation below said second sensor means.

4. The system set forth in claim 3 Wherein:
   said oil detector means includes means for sensing when the liquid level in said vessel has decreased to a level at or below said oil detector means.

5. The system set forth in claim 4 wherein:
said control circuit includes first and second flip-flop circuits operably connected to an OR gate for providing a signal to effect opening of said valve when the liquid level reaches the elevation of said first sensor means or when the level of said liquid reaches the level of said first sensor means and said oil detector means detects the presence of oil in said space.

6. The system set forth in claim 5 wherein:
said control circuit includes an AND gate for receiving a signal from said oil detector means and said first sensor means for providing a signal to one of said flip-flop circuits to effect an output signal to said OR gate.

7. The system set forth in claim 2 including:
third sensor means for detecting a level of liquid in said vessel above said first sensor means, and means associated with said control circuit for receiving signals from said first sensor means, said second sensor means, said third sensor means and said oil detector means for controlling the flow of liquid from said vessel to discharge oil from said vessel when a predetermined oil layer has collected in said vessel between said oil detector means and said third sensor means.

8. The system set forth in claim 7 wherein:
said control circuit includes a timing circuit and means for providing a signal to effect opening of said valve means when said timing circuit is not providing a timing function, said first sensor determines a maximum level of liquid in said vessel and said oil detector means does not detect the presence of oil.

9. The system set forth in claim 7 wherein:
said control circuit includes means for effecting closure of said valve means when either a minimum level of liquid occurs in said vessel or said oil detector means senses the presence of an oil layer.

10. The system set forth in claim 9 wherein:
said control circuit includes means for activating a timing circuit upon closure of said valve means in response to a signal from said second sensor means or said oil detector means and means for effecting opening of said valve means in response to a signal from said first sensor means, said timing circuit and said oil detector means.

11. The system set forth in claim 2 wherein:
said control circuit includes timing means operable to receive a signal from said first sensor means and means for controlling said valve means to discharge only water from said vessel unless the time between sensing said maximum liquid level and the presence of oil at said oil detector means during a cycle of opening and closing said valve means is less than a predetermined amount.

12. The system set forth in claim 11 wherein:
said second sensor means is disposed for sensing liquid generally at the same level as said oil detector means in said vessel.

13. The system set forth in claim 2 wherein:
said second sensor means is disposed for sensing a liquid level in said vessel between the level sensed by said first sensor means and said oil detector means.

14. The system set forth in claim 13 including:
third sensor means disposed in said vessel for sensing a liquid level below said second sensor means and operable to effect closing of said valve means.

15. The system set forth in claim 14 wherein:
said control circuit includes means operable to receive signals from said sensor means and said oil detector means, respectively, for opening said valve means on an increasing liquid level in said vessel and closing said valve means when said oil detector means detects said oil layer after said liquid level has been sensed by said second sensor means.

16. The system set forth in claim 14 wherein:
said control circuit includes means operable to receive signals from said sensor means and said oil detector means, respectively, for opening said valve means on an increasing liquid level in said vessel and closing said valve means when said liquid level is sensed by said third sensor means if said oil detector means senses said oil layer before said liquid level is sensed by said second sensor means.

17. The system set forth in claim 1 wherein:
said discharge conduit is connected to means for measuring the water content of a liquid flowstream flowing through said discharge conduit.

18. A method for measuring net oil production from a source of a mixture of oil and water comprising:
providing a vessel including a conduit for admitting an oil-water mixture to said vessel, said vessel including a space for holding a quantity of oil and water to allow a separate oil layer to accumulate above a volume of water in said vessel, a discharge conduit for discharging liquid from said vessel, valve means interposed in said discharge conduit for controlling the flow of liquid from said vessel and control means for controlling the operation of said valve means to discharge liquid from said vessel, said control means including first sensor means for sensing a first liquid level in said vessel, second sensor means for sensing a second liquid level in said vessel below said first sensor means, oil detector means for sensing said oil layer and third sensor means for sensing a third liquid level below said second sensor means;
causing said valve means to discharge liquid from said vessel if the liquid level increases in said vessel to the level of said first sensor means; and
causing said valve means to close at a selected one of a condition wherein said liquid level decreases to a level sensed by said second sensor means and said liquid level decreases to a level sensed by said third sensor means if said oil detector means senses said oil layer prior to the liquid level decreasing to the level sensed by said second sensor means.

19. A method for measuring net oil production from a source of a mixture of oil and water comprising:
providing a vessel including a conduit for admitting an oil-water mixture to said vessel, said vessel including a space for holding a quantity of oil and water to allow a separate oil layer to accumulate above a volume of water in said vessel, a discharge conduit for discharging liquid from said vessel, valve means interposed in said discharge conduit for controlling the flow of liquid from said vessel and control means for controlling the operation of said valve means to discharge liquid from said vessel, said control means including first sensor means for sensing a first liquid level in said vessel, second sensor means for sensing a second liquid level in said vessel below said first sensor means and oil detector means for sensing said oil layer;

causing said valve means to open to discharge liquid from said vessel when said liquid level increases to the level of said first sensor means; and causing said valve means to close when a selected one of a condition occurs wherein said oil layer is detected at said oil detector means and said liquid level decreases to the level of said second sensor means when a cycle of opening said valve means and closing said valve means occurs more than once during a predetermined period of time.

20. A method for measuring net oil production from a source of a mixture of oil and water comprising:

providing a vessel including a conduit for admitting an oil-water mixture to said vessel, said vessel including a space for holding a quantity of oil and water to allow a separate oil layer to accumulate above a volume of water in said vessel, a discharge conduit for discharging liquid from said vessel, valve means interposed in said discharge conduit for controlling the flow of liquid from said vessel and control means for controlling the operation of said valve means to discharge liquid from said vessel, said control means including first sensor means for sensing a first liquid level in said vessel, second sensor means for sensing a second liquid level in said vessel below said first sensor means, oil detector means for sensing said oil layer and third sensor means for sensing a third liquid level below said second sensor means;

causing said valve means to open when the liquid level in said vessel increases to the level of said first sensor means; and causing said valve means to close at a selected one of a condition wherein said oil layer is detected by said oil detector means after the liquid level has decreased to a level below said second sensor means and said liquid level decreases to a level sensed by said third sensor means when said oil layer is detected at said oil detector means before said liquid level has decreased to the level of said second sensor means.

* * * * *